(12) United States Patent
Muraishi (10) Patent No.: US 8,437,047 B2
(45) Date of Patent: May 7, 2013

(54) IMAGE PROCESSING APPARATUS, CONTROL METHOD, AND PROGRAM

(75) Inventor: Masaaki Muraishi, Musashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 505 days.

(21) Appl. No.: 12/713,795

(22) Filed: Feb. 26, 2010

(65) Prior Publication Data

US 2010/0245952 A1 Sep. 30, 2010

(30) Foreign Application Priority Data

Mar. 24, 2009 (JP) ................................ 2009-072864

(51) Int. Cl.
| | |
|---|---|
| G06T 5/00 | (2006.01) |
| G06F 15/00 | (2006.01) |
| H04N 1/46 | (2006.01) |
| H04N 1/04 | (2006.01) |
| G03F 3/08 | (2006.01) |
| G06K 15/00 | (2006.01) |
| G03G 15/00 | (2006.01) |
| G06K 9/34 | (2006.01) |

(52) U.S. Cl.
USPC ............ 358/3.26; 358/1.2; 358/505; 358/2.1; 358/518; 358/1.16; 358/1.9; 358/474; 399/367; 399/45; 382/173

(58) Field of Classification Search .................. 358/505, 358/1.2, 2.1, 518, 1.16, 1.9, 474, 3.26; 399/367, 399/45; 382/173
See application file for complete search history.

(56) References Cited

U.S. PATENT DOCUMENTS

| | | | |
|---|---|---|---|
| 6,765,703 B1 | | 7/2004 | Watanabe |
| 7,561,300 B2 * | | 7/2009 | Yamazaki et al. ............. 358/1.9 |
| 2003/0142376 A1 * | 7/2003 | Tabata et al. ................... 358/518 |
| 2004/0057079 A1 * | 3/2004 | Ohsawa .......................... 358/2.1 |
| 2004/0057763 A1 * | 3/2004 | Kawai et al. ................... 399/367 |
| 2005/0002072 A1 | 1/2005 | Iguchi ............................ 358/509 |
| 2005/0078867 A1 | 4/2005 | Kanno ........................... 382/163 |
| 2005/0122535 A1 * | 6/2005 | Oki ................................ 358/1.9 |
| 2005/0128535 A1 | 6/2005 | Ogino ........................... 358/486 |

(Continued)

FOREIGN PATENT DOCUMENTS

| | | |
|---|---|---|
| CN | 1607811 | 4/2005 |
| JP | 2001-348137 | 12/2001 |
| JP | 2006-054903 A | 2/2006 |

OTHER PUBLICATIONS

Extended European Search Report, dated Jun. 25, 2010, from corresponding European Application No. 10156748.5.

(Continued)

*Primary Examiner* — Charlotte M Baker
*Assistant Examiner* — Rury Grisham
(74) *Attorney, Agent, or Firm* — Fitzpatrick, Cella, Harper & Scinto (57) ABSTRACT

An image processing apparatus which reads an original to generate monochrome image data, comprises a determination unit configured to determine which of a first instruction to read the original using RGB sensors or a second instruction to read the original using a BW sensor is input; a reading unit configured to read the original using the RGB sensors when the determination unit determined that the first instruction is input, and read the original using the BW sensor when the determination unit determined that the second instruction is input; and a generation unit configured to generate monochrome image data by reading the original by the reading unit using the respective sensors.

9 Claims, 11 Drawing Sheets

U.S. PATENT DOCUMENTS

| | | | | |
|---|---|---|---|---|
| 2006/0279748 A1* | 12/2006 | Kamisuwa | | 358/1.2 |
| 2007/0139675 A1* | 6/2007 | Kawano et al. | | 358/1.9 |
| 2007/0171488 A1 | 7/2007 | Chen et al. | | 358/498 |
| 2007/0223058 A1* | 9/2007 | Cotte et al. | | 358/474 |
| 2008/0008484 A1* | 1/2008 | Takahashi et al. | | 399/45 |
| 2008/0204814 A1 | 8/2008 | Nishi | | 358/296 |
| 2009/0316212 A1* | 12/2009 | Sano | | 358/2.1 |
| 2010/0128331 A1* | 5/2010 | Hamano et al. | | 358/505 |
| 2010/0208995 A1* | 8/2010 | Ozawa | | 382/173 |
| 2010/0328693 A1* | 12/2010 | Itagaki | | 358/1.9 |
| 2011/0216370 A1* | 9/2011 | Kuronuma | | 358/1.16 |

OTHER PUBLICATIONS

Chinese Office Action dated Oct. 20, 2011, from corresponding Chinese Application No. 201010139722.7.

* cited by examiner

IMAGE PROCESSING APPARATUS, CONTROL METHOD, AND PROGRAM

BACKGROUND OF THE INVENTION

1. Field of the Invention

The present invention relates to an image processing apparatus, control method, and program for obtaining a monochrome output material from image data using a scanner.

2. Description of the Related Art

A conventional image processing apparatus includes both RGB color sensors and a BW monochrome sensor and switches between a color mode and a monochrome mode. A method is proposed for achieving quick monochrome reading and obtaining a high-quality color image (see Japanese Patent Laid-Open No. 2006-54903). According to this method, in the monochrome mode, a signal from the monochrome sensor is divisionally processed using not only an A/D converter for the monochrome sensor but also an A/D converter for the color sensors.

Japanese Patent Laid-Open No. 2006-54903 describes a color reading mode in which RGB color sensors read an original, and a monochrome reading mode in which a BW monochrome sensor reads an original. However, in Japanese Patent Laid-Open No. 2006-54903, the color reading mode and monochrome reading mode are not selectively used when outputting a monochrome image of an original.

When a color original is read in the monochrome reading mode in monochrome output, the reading speed is greatly increased when compared to when it is read in the color reading mode. However, the tone reproducibility of a specific color sometimes deteriorates greatly. This is because a filter corresponding to the BW monochrome sensor has a characteristic similar to that of a G filter (green filter) and information of part of the blue and red bands is lost. In contrast, when a color original is read in the color reading mode, the tone reproducibility is improved but the reading speed is low because the original is read using a plurality of sensors.

SUMMARY OF THE INVENTION

The present invention has been made to solve the conventional problems. The present invention provides an image processing apparatus capable of improving the reproduction of an original tone and also increases the reading speed when in the process of forming a monochrome image.

The present invention provides further an image processing selection apparatus capable of selecting whether color reading or monochrome reading is performed for monochrome output when reading an original to output a monochrome image.

According to one aspect of the present invention, there is provided an image processing apparatus which reads an original to generate monochrome image data, comprising: a determination unit configured to determine which of a first instruction to read the original using RGB sensors or a second instruction to read the original using a BW sensor is input; a reading unit configured to read the original using the RGB sensors when the determination unit determined that the first instruction is input, and read the original using the BW sensor when the determination unit determined that the second instruction is input; and a generation unit configured to generate monochrome image data by reading the original by the reading unit using the respective sensors.

According to another aspect of the present invention, there is provided a method of controlling an image processing apparatus which reads an original to generate monochrome image data, the method comprising: a determination step of causing a determination unit of the image processing apparatus to determine which of a first instruction to read the original using RGB sensors or a second instruction to read the original using a BW sensor is input; a reading step of causing a reading unit of the image processing apparatus to read the original using the RGB sensors when the determination step determined that the first instruction is input, and read the original in monochrome using the BW sensor when the determination step determined that the second instruction is input; and a generation step of causing a generation unit of the image processing apparatus to generate monochrome image data by reading the original in the reading step using the respective sensors.

When outputting the monochrome image of an original, an image processing apparatus equipped with a color scanner and monochrome scanner prompts the user to select color or monochrome reading. Color reading, can improve the reproduction of tones in an original.

Monochrome reading can increase the reading speed. That is, the user can select a reading method to increase the processing speed or improve the reproduction of a monochrome image at his request.

Further features of the present invention will become apparent from the following description of exemplary embodiments (with reference to the attached drawings).

DESCRIPTION OF THE EMBODIMENTS

Embodiments of the present invention will now be described below with reference to the accompanying drawings.

<First Embodiment>

The first embodiment of the present invention will be described. The first embodiment will explain a method of reading an original in a designated reading mode in a system capable of designating a reading mode in monochrome printing.

Figure 1:
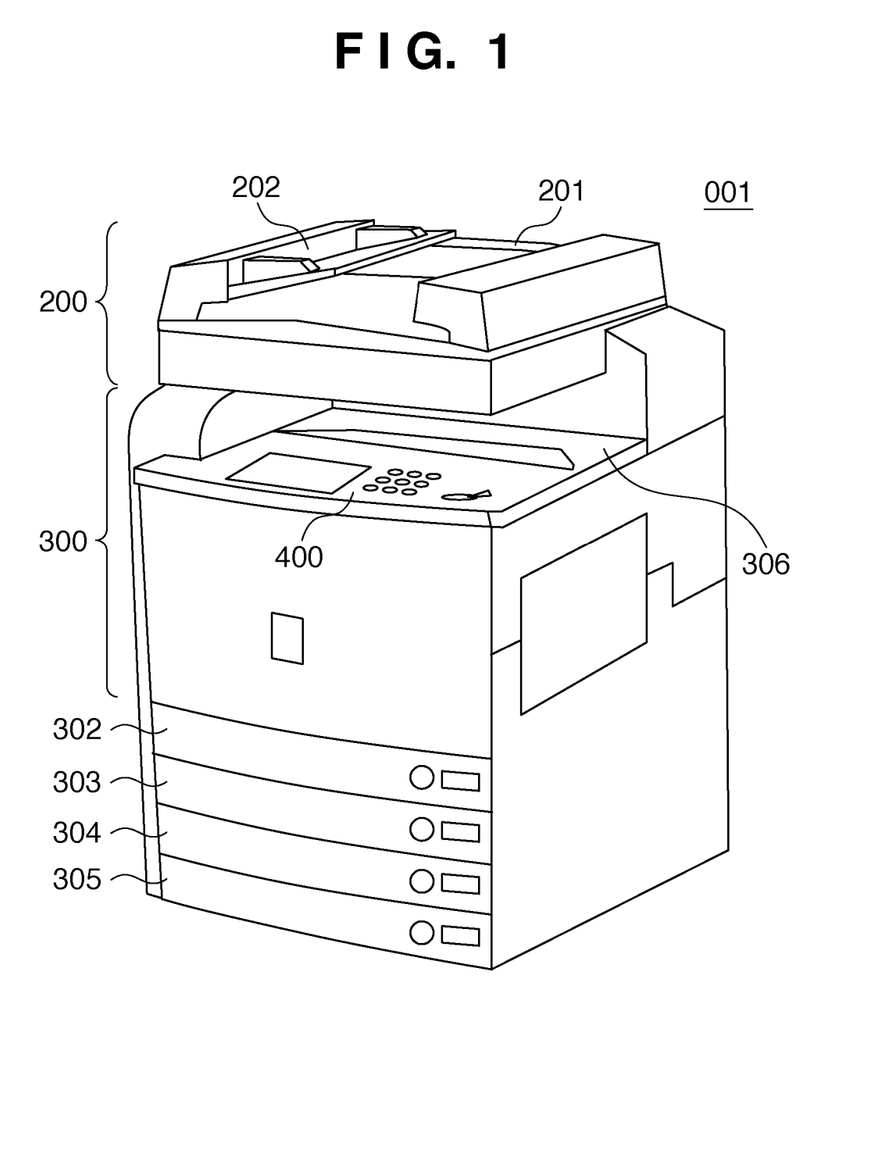
FIG. 1 is a view exemplifying the schematic appearance of a digital multifunctional peripheral according to an embodiment.

FIG. 1 is a view showing the arrangement of digital multifunctional peripheral 001 having an output device and image processing system according to the first embodiment. However, the present invention is not limited to the digital multifunctional peripheral and is applicable to those having similar functions.

<Image Input Unit (Scanner)>

Figure 2:
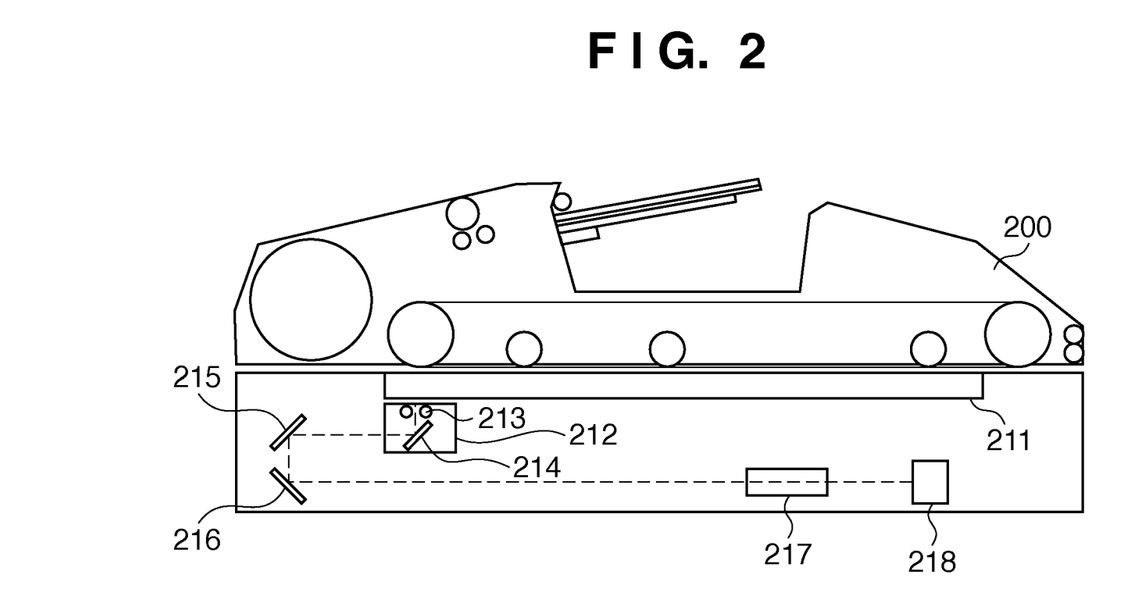
FIG. 2 is a sectional view exemplifying the arrangement of the scanner of the digital multifunctional peripheral according to the embodiment.

FIG. 2 shows details of a scanner 200 serving as an image input device in FIG. 1. In FIG. 2, a scanner unit 212 includes an original illumination lamp 213 and scanning mirrors 214 to 216. In general, the scanner unit 212 horizontally reciprocates to scan an original on a platen glass 211 of an original table by using the original illumination lamp 213. Then, the scanner unit 212 causes light reflected by the original to enter a CCD sensor 218 having RGB color sensors (RGB sensors) and a BW monochrome sensor (BW sensor) via the scanning mirrors 214 to 216 and a lens 217. The CCD sensor 218 converts the light into electrical signals representing RGB color image data and monochrome image data. The scanner has two reading modes: a color reading mode in which an original is read using the RGB color sensors and a monochrome reading mode in which an original is read using the BW monochrome sensor. These sensors form a reading unit.

A user sets original sheets on a tray 202 of a document feeder 201, and designates reading via an operation unit 400. Then, a controller CPU 103 instructs the scanner 200 to feed the original sheets one by one by the document feeder 201 and read them. The third embodiment will describe a case in which the document feeder 201 is mounted and a case in which it is not mounted. The tray 202 of the document feeder 201 includes a weight detection unit (not shown). Note that the weight detection unit is assumed to be used in the fifth embodiment to be described later, and may not be attached to apparatuses in the first to fourth embodiments.

<Image Output Unit (Printer)>

In FIG. 1, a printer 300 serving as an image output device converts raster image data into an image to be printed on a sheet. As the printing method, there are an electrophotographic method of fixing toner onto a sheet using a photosensitive drum and photosensitive belt, and an inkjet method of discharging ink from a small nozzle array to directly print an image on a sheet. However, the printing method is not particularly limited in the embodiment. The controller CPU 103 instructs the printer 300 to start a print operation. The printer 300 includes a plurality of paper feed sources so that the user can select different paper sizes or different orientations. Paper cassettes 302, 303, 304, and 305 are mounted in correspondence with the respective paper feed sources. Sheets of each type are set in the paper cassette. A discharge tray 306 receives a printed sheet when the sheet is discharged.

<Arrangement of Control System of Digital Multifunctional Peripheral>

Figure 3:
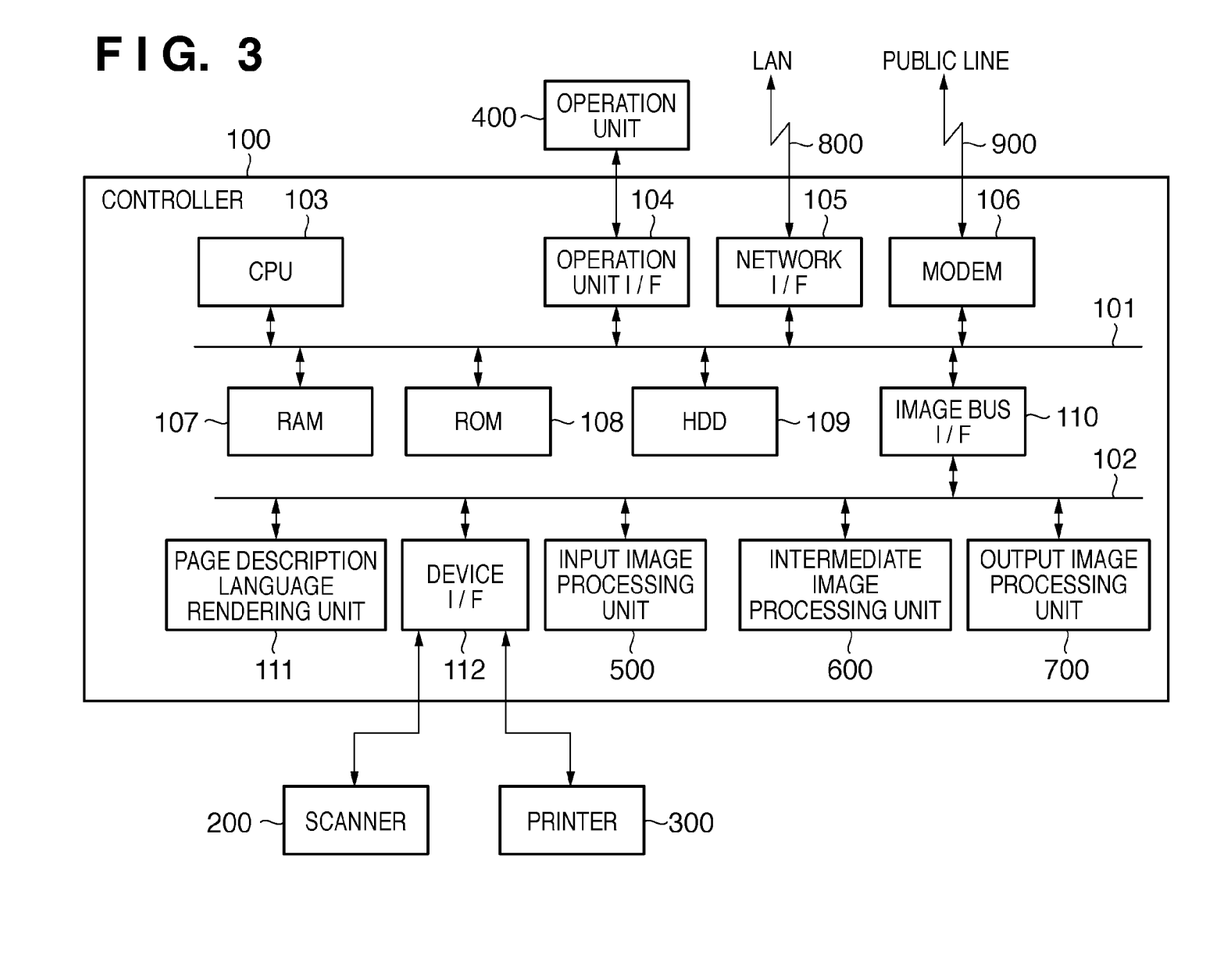
FIG. 3 is a block diagram exemplifying the arrangement of the control system of the digital multifunctional peripheral according to the embodiment.

FIG. 3 shows the arrangement of the control system of digital multifunctional peripheral 001 according to the first embodiment. A controller 100 is connected to the scanner 200 serving as an image input device and the printer 300 serving as an image output device. The controller 100 is also connected to a LAN 800 and public line 900 to input/output image data and device information. The CPU 103 functions as a controller for controlling the overall digital multifunctional peripheral 001. A RAM 107 is a system work memory for operating the CPU 103, and is also used as an image memory for temporarily storing image data. A ROM 108 is used as a boot ROM and stores the boot program of digital multifunctional peripheral 001. An HDD (Hard Disk Drive) 109 stores system software, image data, and the like. An operation unit I/F 104 is an interface with the operation unit 400, and outputs image data to the operation unit 400 for display on the operation unit 400. The operation unit I/F 104 notifies the CPU 103 of information input by the user via the operation unit 400. A network I/F 105 is connected to the LAN 800 to input/output information. A modem 106 is connected to the public line 900 to perform modulation/demodulation processing to transmit/receive data. These devices are arranged on a system bus 101.

An image bus I/F 110 is a bus bridge which connects the system bus 101 and an image bus 102 for transferring image data at high speed, and converts the data structure. The image bus 102 is formed from a high-speed bus such as a PCI bus or IEEE1394 bus. The following devices are arranged on the image bus 102. A page description language rendering unit 111 renders a PDL code into a raster image, and converts accessory information into a format available within the controller. A device I/F 112 connects the scanner 200 and printer 300 serving as image input/output devices to the controller 100, and performs synchronous/asynchronous conversion of image data.

An input image processing unit 500 corrects, processes, and edits input image data such as an image scanned by the scanner 200 or an image externally received via the network I/F 105. After that, the input image processing unit 500 performs processing suited to printout or image transmission. An intermediate image processing unit 600 compresses/decompresses image data, and enlarges/reduces an image. An output image processing unit 700 executes correction, resolution conversion, and the like for printout image data in accordance with a printer.

Although the internal arrangement of the output image processing unit 700 will be described later with reference to FIG. 6, the output image processing unit 700 has the following functions. As an original mode, the output image processing unit 700 has a text mode in which it is recognized that an entire original bears a text, a filtering unit 703 in the output image processing unit 700 performs edge enhancement processing, and a gamma correction unit 704 performs correction processing using a correction coefficient for the text mode. The output image processing unit 700 has a photo mode in which it is recognized that an entire original bears a photo, and the gamma correction unit 704 in the output image processing unit 700 performs correction processing using a correction coefficient for the photo mode. When an original contains both a text and photo, the output image processing unit 700 provides, as a mixed mode, a text/photo mode in which it is recognized that the original bears both a text and photo, an image area determination unit 503 in the input image processing unit 500 determines an image area, and the gamma correction unit 704 in the output image processing unit 700 performs correction processing using a correction coefficient for the text/photo mode.

Figure 4:
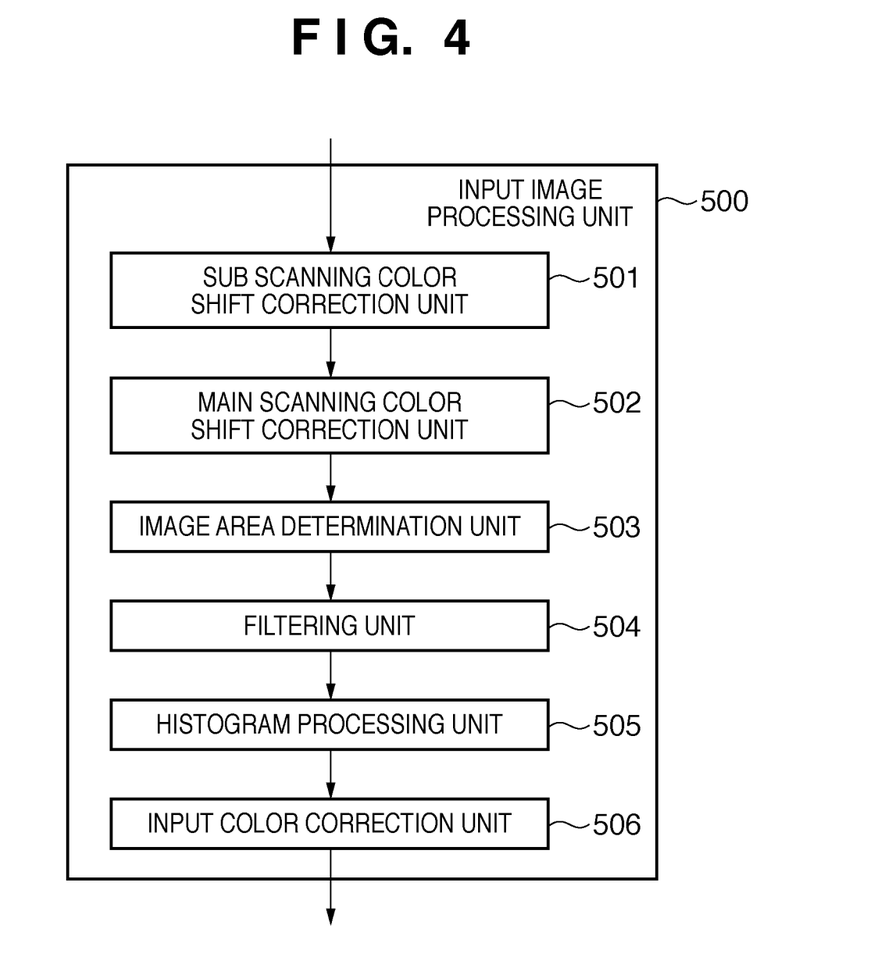
FIG. 4 is a block diagram exemplifying the arrangement of an input image processing unit according to the embodiment.

FIG. 4 is a block diagram showing the detailed arrangement of the input image processing unit 500 in the image processing apparatus according to the first embodiment of the present invention. A sub scanning color shift correction unit 501 corrects the color shift of an input image in the sub scanning direction. For example, the sub scanning color shift correction unit 501 performs a 1×5 matrix calculation for each color of image data. A main scanning color shift correction unit 502 corrects the color shift of an input image in the main scanning direction. For example, the main scanning color shift correction unit 502 executes a 5×1 matrix calculation for each color of image data. The image area determination unit 503 identifies the type of image in an input image. For example, the image area determination unit 503 identifies pixels forming each type of image such as a photo part/text part or chromatic part/achromatic part in an input image. The image area determination unit 503 generates attribute flag data representing the type for each pixel. A filtering unit 504 arbitrarily corrects the spatial frequency of an input image. For example, the filtering unit 504 performs a 9×9 matrix calculation. A histogram processing unit 505 samples and counts image signal data in an input image. For example, the histogram processing unit 505 determines which of color and monochrome images is an input image, and determines the background level of the input image.

An input color correction unit 506 corrects the tint of an input image. For example, the input color correction unit 506 converts the color space of an input image into an arbitrary color space. Processes in the input image processing unit 500 are not limited to only those using all the sub scanning color shift correction unit 501 to input color correction unit 506 described above. Another image processing module may be added or if necessary, the above-mentioned modules may be deleted. The processing order of the sub scanning color shift correction unit 501 to input color correction unit 506 is not limited to the foregoing one. That is, a feature of the image processing apparatus in the embodiment is that the input image processing unit (input image processing unit 500) includes at least one of the main scanning color shift correction unit 502, sub scanning color shift correction unit 501, filtering unit 504, histogram processing unit 505, and input color correction unit 506. Image data processed by the input image processing unit 500 or attribute flag data generated by the image area determination unit 503 is transferred to the intermediate image processing unit 600. Note that image data and attribute flag data from the page description language rendering unit 111 may be directly input to the intermediate image processing unit 600 without the mediacy of image processing by the input image processing unit 500.

Figure 5:
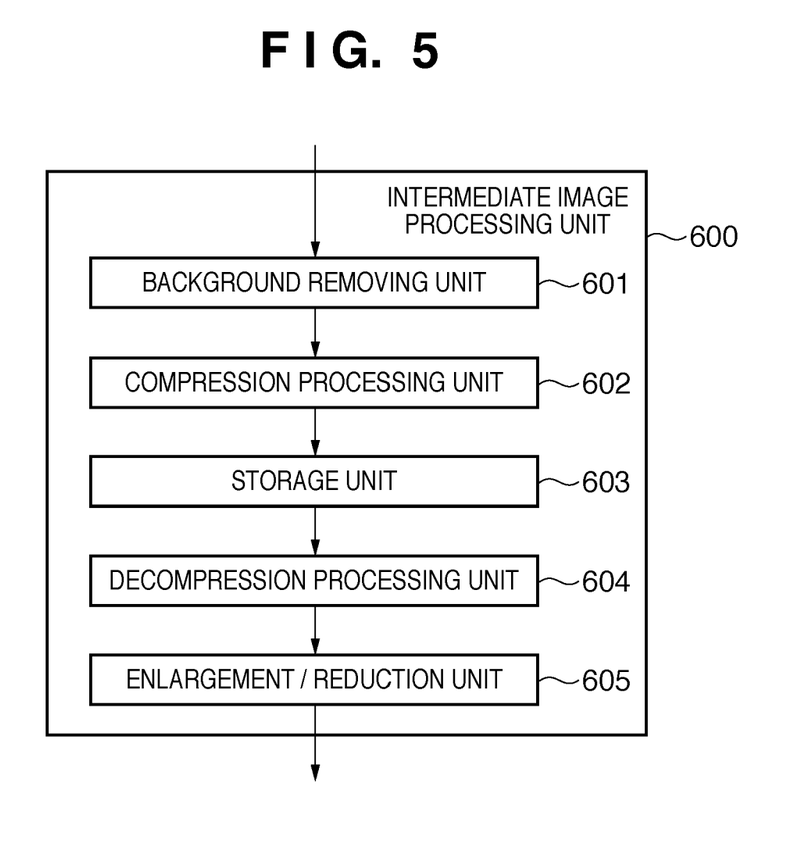
FIG. 5 is a block diagram exemplifying the arrangement of an intermediate image processing unit according to the embodiment.

FIG. 5 is a block diagram showing the detailed arrangement of the intermediate image processing unit 600 in the image processing apparatus according to the first embodiment of the present invention. Image data having undergone the above-mentioned correction processing and the like by the input image processing unit 500 is transferred to the intermediate image processing unit 600 together with attribute flag data. Then, the image data undergoes detailed processes by respective processing units in the following arrangement. A background removing unit 601 removes a background color, i.e., unnecessary background fogging from image data. For example, the background removing unit 601 removes the background by a 3×8 matrix calculation or based on a one-dimensional lookup table (LUT). A compression processing unit 602 compresses image data and attribute flag data according to predetermined compression methods. A storage unit 603 stores image data and attribute flag data compressed by the compression processing unit 602. The storage unit 603 is formed from a large-capacity hard disk or the like. A decompression processing unit 604 decompresses compressed image data and attribute flag data according to predetermined decompression methods. An enlargement/reduction unit 605 performs enlargement/reduction processing at a magnification set by the user on an operation panel 401 or a magnification complying with externally received data. The enlargement/reduction processing uses, for example, scaling by nearest-neighbor processing for assigning the known value of a neighboring pixel to a pixel of interest and replacing the pixel of interest with the assigned value, or scaling by bi-linear processing of assigning an interpolation value between a pixel of interest and a neighboring pixel.

More specifically, in the image processing apparatus according to the embodiment, the intermediate image processing unit 600 includes a background removing unit (background removing unit 601) which removes the background color of image data corrected by the input image processing unit 500, thereby removing background fogging which becomes unnecessary in image formation. The intermediate image processing unit 600 also includes an image compression unit (compression processing unit 602) which compresses image data at a predetermined compression ratio. The intermediate image processing unit 600 includes a storage unit (storage unit 603) which stores image data compressed by the compression processing unit 602, and a decompression unit (decompression processing unit 604) which decompresses image data stored in the storage unit 603. The intermediate image processing unit 600 includes a scaling unit (enlargement/reduction unit 605) which scales (enlarges/reduces) image data decompressed by the decompression processing unit 604 at a predetermined scaling ratio. The intermediate image processing unit 600 includes an image output unit (output image processing unit 700) which outputs image data scaled by the enlargement/reduction unit 605.

Figure 6:
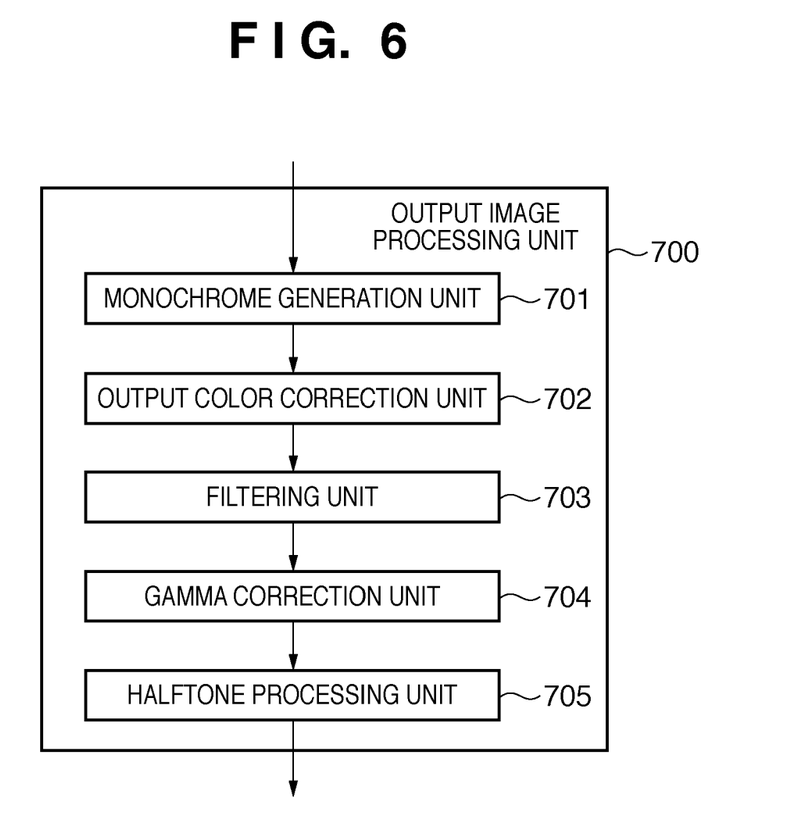
FIG. 6 is a block diagram exemplifying the arrangement of an output image processing unit according to the embodiment.

FIG. 6 is a block diagram showing the detailed arrangement of the output image processing unit 700 in the image processing apparatus according to the first embodiment of the present invention. A monochrome generation unit 701 converts color image data into monochrome data. When printing in a single color, the monochrome generation unit 701 converts color image data, for example, RGB data into single gray color data. For example, the monochrome generation unit 701 performs a 1×3 matrix calculation to multiply RGB data by an arbitrary constant and generate a gray signal. An output color correction unit 702 corrects the color in accordance with the characteristics of the printer 300 for outputting image data. For example, the output color correction unit 702 performs a 4×8 matrix calculation or direct mapping processing. The filtering unit 703 arbitrarily corrects the spatial frequency of image data. For example, the filtering unit 703 executes a 9×9 matrix calculation. The gamma correction unit 704 performs gamma correction in accordance with the characteristics of the printer 300 for output. The gamma correction unit 704 uses a general one-dimensional lookup table (LUT). A halftone processing unit 705 executes arbitrary halftone processing in accordance with the number of tones of the printer 300 for output. The halftone processing unit 705 performs arbitrary screen processing such as binary or base-32 processing, and error diffusion processing.

Processes in the output image processing unit 700 are not limited to only those using all the monochrome generation unit 701 to halftone processing unit 705. Another image processing module may be added or if necessary, the above-mentioned modules may be deleted. The processing order of the monochrome generation unit 701 to halftone processing unit 705 is not limited to the foregoing one. That is, a feature of the image processing apparatus in the embodiment is that the image output unit (output image processing unit 700) includes at least one of the monochrome generation unit 701, output color correction unit 702, filtering unit 703, gamma correction unit 704, and halftone processing unit 705. After the image area determination unit 503, the above-described image processing units of the input image processing unit 500, intermediate image processing unit 600, and output image processing unit 700 receive image data and even attribute flag data generated by the image area determination unit 503 or in accordance with externally received data. Each image processing unit performs image processing using a processing coefficient optimum for each image region in accordance with the attribute flag data.

For example, the filtering unit 703 of the output image processing unit 700 in FIG. 6 enhances the sharpness of a character by enhancing the high frequency component of an image in the test region. The filtering unit 703 can execute so-called low-pass filter processing for halftone dot region to remove a moire component unique to a digital image. For example, in a mode called a toner saving mode in which the toner consumption amount is reduced to save the printout cost, the output color correction unit 702 adjusts a consumption amount reduction ratio individually for the text region, photo region, and halftone dot region. By this processing, the toner consumption amount can be reduced without greatly deteriorating the image quality. In this way, each processing module performs processing optimum for an image region in accordance with attribute flag data, improving the image quality.

<Operation Unit>

Figure 7:
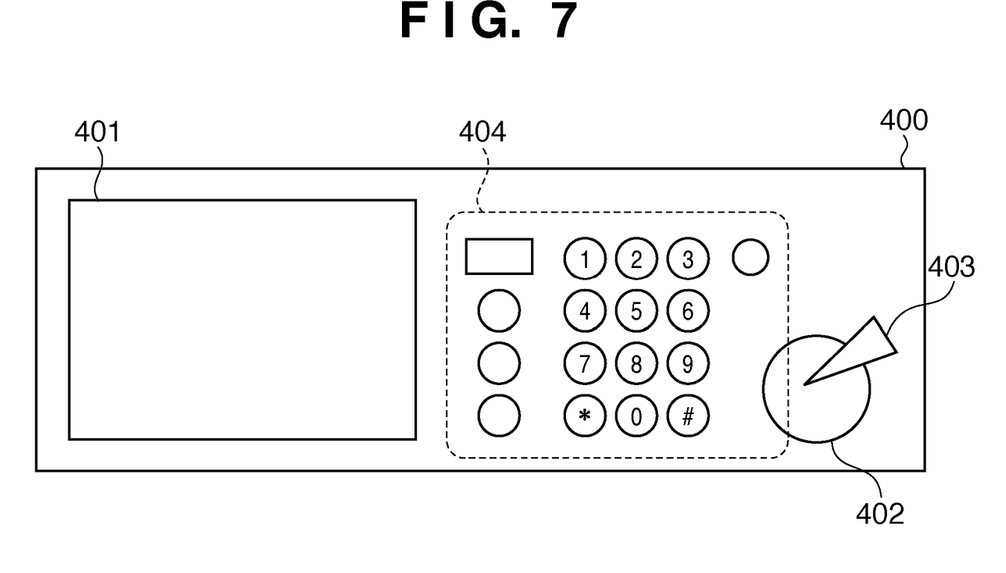
FIG. 7 is a view exemplifying the schematic appearance of the operation unit of the digital multifunctional peripheral according to the embodiment.

FIG. 7 shows the operation unit 400 of the digital multifunctional peripheral according to the first embodiment. The liquid crystal operation panel 401 is a combination of a liquid crystal and touch panel, and displays setting contents and soft keys. A start key 402 is a hard key to designate the start of a copy operation or the like. The start key 402 incorporates green and red LEDs, and turns on the green LED when the operation can start and the red LED when it cannot start. A stop key 403 is a hard key used to stop an operation. A hard key set 404 includes a ten-key pad, clear key, reset key, guide key, and user mode key.

<Monochrome Sensor Switching Setting>

Figure 8:
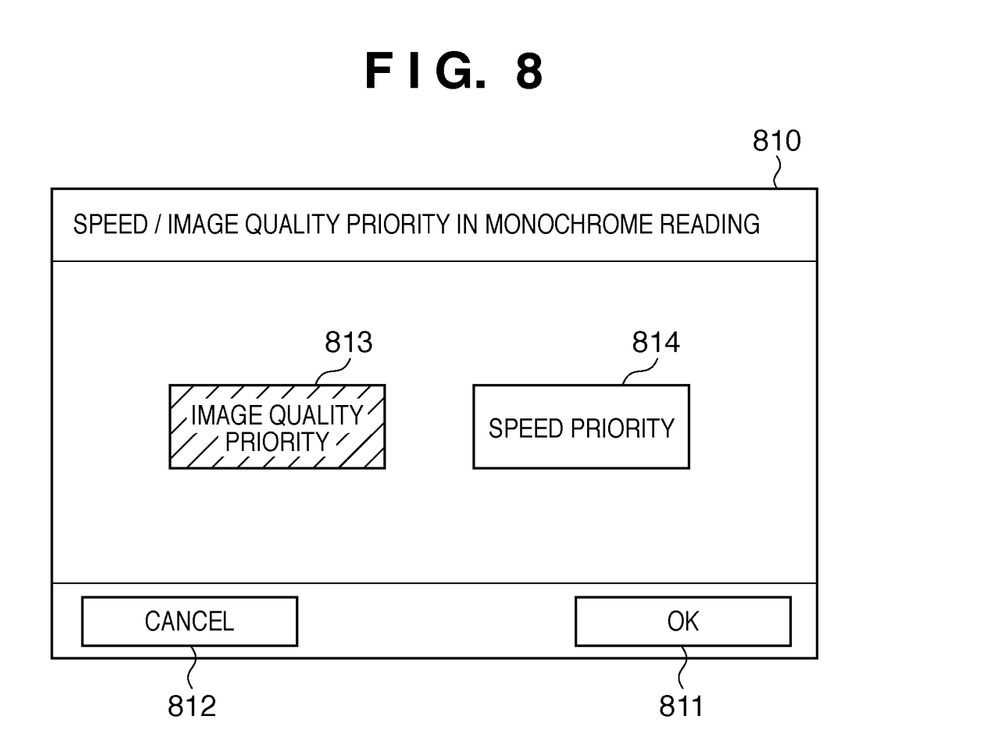
FIG. 8 is a view exemplifying an operation window according to the embodiment.

FIG. 8 exemplifies an operation window for setting which of the image quality and speed is given priority when performing the above-described monochrome copying. This operation window will be called a monochrome sensor switching setup window. Image quality priority means a color reading mode in which an original is read using the RGB color sensors. Speed priority means a monochrome reading mode in which an original is read using the BW monochrome sensor. A monochrome sensor switching setup window 810 has an image quality priority button 813, speed priority button 814, OK button 811, and cancel button 812. The user operates the image quality priority button 813 or speed priority button 814 to designate the color reading mode or monochrome reading mode in monochrome printing. When the user presses the OK button 811, a mode setting content displayed immediately before pressing the button is held and the operation window disappears. When the user presses the cancel button 812, a mode setting content displayed immediately before opening the operation window is held and the operation window disappears.

<Processing Sequence>

Figure 9:
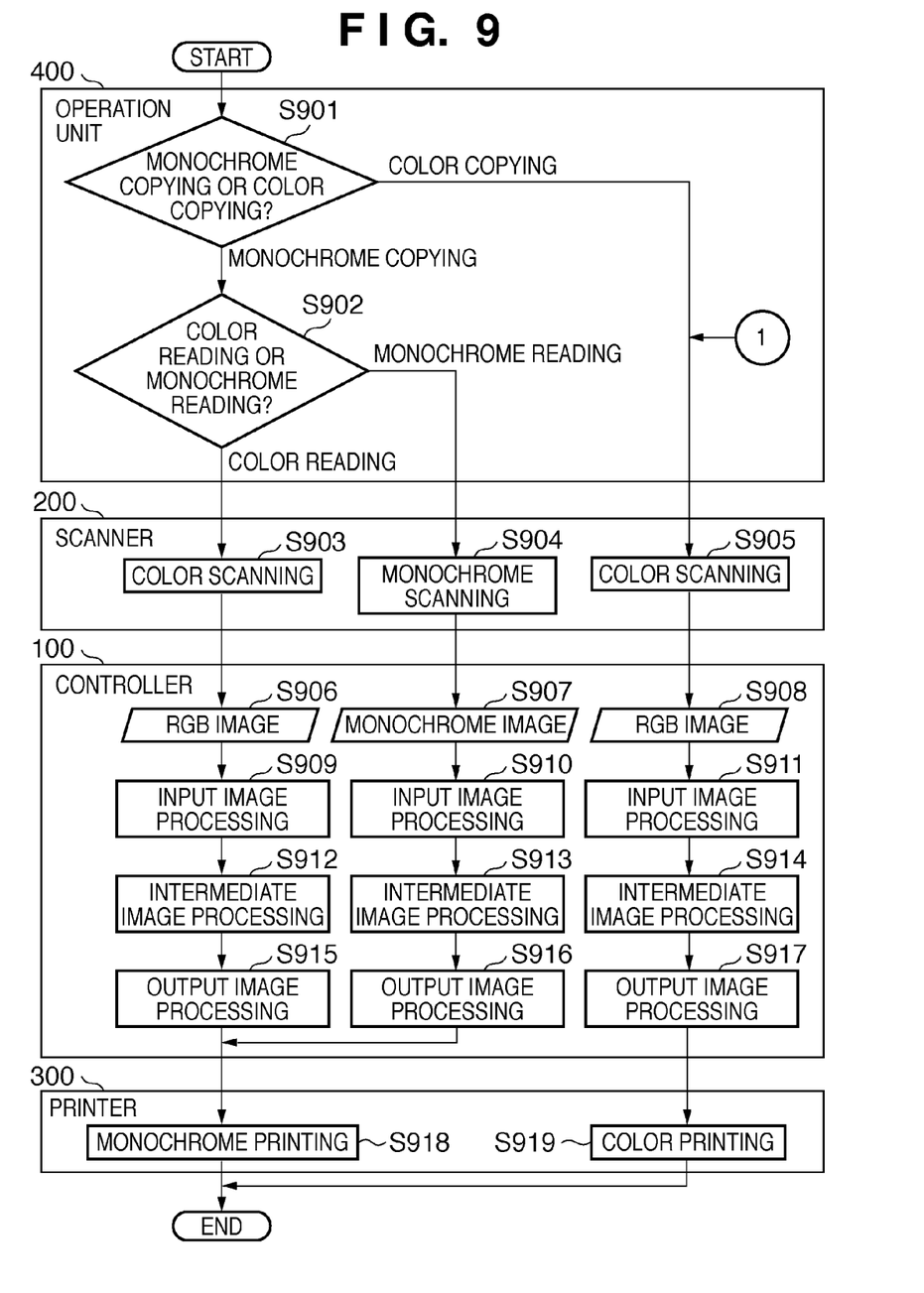
FIG. 9 is a flowchart showing a processing sequence in the first embodiment.

The first embodiment according to the present invention will be explained. FIG. 9 is a flowchart showing a processing sequence according to the first embodiment. For copying, the user selects either monochrome output or color output via the operation unit 400 in S901. If the user selects monochrome output, it is determined in S902 in accordance with a set value which of an instruction (first instruction) to perform color reading or an instruction (second instruction) to perform monochrome reading is input. At this time, the monochrome sensor switching setting may be made before the start of copying or after selecting monochrome output or color output. If it is determined that the instruction (first instruction) to perform color reading is input in S902, an original is read using the RGB color sensors in the CCD sensor 218, acquiring RGB color image data 906 in S903. In S909, the input image processing unit 500 performs image area determination processing and the like. In S912, the intermediate image processing unit 600 executes compression processing, data storage, and the like. In S915, the output image processing unit 700 performs background color removal, monochrome conversion, and the like, generating monochrome image data. Thereafter, in S918, the printer 300 is used to print in monochrome. If it is determined that the instruction (second instruction) to perform monochrome reading is input in S902, an original is read using the BW monochrome sensor (BW sensor) in the CCD sensor 218 in S904, generating monochrome image data 907.

In S910, the input image processing unit 500 performs image area determination processing and the like. At this time, scanning is done using only the BW monochrome sensor, so no color shift between sub scanning and main scanning is generated. In the input image processing unit 500, therefore, the sub scanning color shift correction unit 501 and main scanning color shift correction unit 502 need not execute processing. In S913, the intermediate image processing unit 600 executes compression processing, data storage, and the like. In S916, the output image processing unit 700 performs gamma processing and the like. At this time, scanning is done using only the BW monochrome sensor, so the monochrome generation unit 701 in the output image processing unit 700 need not perform processing. In S918, the printer 300 is used to print in monochrome. If the user selects color copying in S901, an original is scanned using the RGB color sensors in the CCD sensor 218, acquiring RGB color image data 908 in S905. In S911, the input image processing unit 500 performs image area determination processing and the like. In S914, the intermediate image processing unit 600 executes compression processing, data storage, and the like. In S917, the output image processing unit 700 performs filter correction and the like. Because of color output, the monochrome generation unit 701 in the output image processing unit 700 need not perform processing. In S919, the printer 300 is used to print in color.

The first embodiment can improve the tone reproducibility by performing color reading, and increase the reading speed by executing monochrome reading when outputting the monochrome image of an original. The user can select color reading or monochrome reading, obtaining a monochrome image he wants.

<Second Embodiment>

The second embodiment of the present invention will be described. The second embodiment will explain a method of transmitting/receiving data between apparatuses by connecting to a LAN 800 via a network I/F 105 or a public line 900 via a modem 106 in monochrome sensor switching. In the first embodiment, if the user selects monochrome output and color reading using the operation unit 400 when transmitting/receiving data using the LAN 800 or public line 900, an original is read using the RGB color sensors in the CCD sensor 218, acquiring color image data. Then, the compression processing unit 602 in the intermediate image processing unit 600 performs processes such as compression processing and color conversion.

After processing by the monochrome generation unit 701 in the output image processing unit 700, information obtained by color reading is attached as attribute data to image data. The image data is transmitted using the LAN 800 or public line 900. In the second embodiment, if the user selects monochrome output and monochrome reading using an operation unit 400, an original is read using a BW monochrome sensor in a CCD sensor 218, acquiring monochrome image data. An input image processing unit 500 executes image area determination processing and the like. Since scanning is done using only the monochrome sensor, no color shift between sub scanning and main scanning is generated. Hence, a sub scanning color shift correction unit 501 and main scanning color shift correction unit 502 in the input image processing unit 500 need not perform processing. After an intermediate image processing unit 600 executes processing for a storage unit 603, the image data is transmitted using the LAN 800 or public line 900.

In the second embodiment, if the user selects color output and color reading using the operation unit 400, an original is scanned using the RGB color sensors in the CCD sensor 218, acquiring color image data. A compression processing unit 602 in the intermediate image processing unit 600 performs processes such as compression processing and color conversion. After the intermediate image processing unit 600 executes processing for the storage unit 603, the image data is transmitted using the LAN 800 or public line 900. At this time, the image data is transmitted in the format of JPEG, PDF, or the like. The communication protocol is FTP, WINDOWS (SMB), or the like, but is not limited in the second embodiment.

According to the second embodiment, even when data is transmitted/received using the LAN 800 or public line 900 via the network I/F, the user can attain a desired monochrome image.

<Third Embodiment>

The third embodiment of the present invention will be described. The third embodiment will explain a method of switching reading processing between a case in which a document feeder 201 is mounted on a scanner 200 serving as an image input device and a case in which the document feeder 201 is not mounted (i.e., only platen reading is possible). More specifically, when the document feeder 201 is mounted on the scanner 200, reading can be switched between the RGB color sensors and the BW monochrome sensor, like the first embodiment. However, when the document feeder 201 is not mounted on the scanner 200 (i.e., only platen reading is possible), monochrome sensor switching described in the first embodiment is invalidated, and only reading using the RGB color sensors is validated. In platen reading, the sensors reciprocate below the original table, and the reading speed becomes lower than that in the use of the document feeder 201, failing to obtain the effect of speed priority selected on the setup window shown in FIG. 8.

A processing sequence in the third embodiment will be explained. When reading an original using the document feeder 201, the processing shown in FIG. 9 is executed similarly to the first and second embodiments. When the document feeder 201 is not mounted and platen reading is to be performed, the user sets an original on a platen glass 211 of the original table in FIG. 2. If the user selects monochrome output in S901 of FIG. 9, color reading (image quality priority) is automatically selected without determining in S902 which of color reading and monochrome reading has been set in FIG. 8. Processes in S904 and subsequent steps are the same as those in the first and second embodiments. If monochrome reading using the BW monochrome sensor is possible in platen reading and the reading speed can be increased, it is also possible to switch the reading setting, similar to the first embodiment. When the document feeder 201 is mounted on the scanner 200, monochrome sensor switching is enabled as described in the first embodiment.

In the third embodiment, the reading mode is automatically switched depending on selection of which of the document feeder or platen reading is used. In platen reading, priority is given to the image quality, ensuring the image quality.

<Fourth Embodiment>

The fourth embodiment of the present invention will be described. The fourth embodiment will explain a method of automatically switching priority between the image quality and the speed in accordance with the above-mentioned original mode (text mode, photo mode, or text/photo mode) in monochrome sensor switching.

In the text mode, a sharp image is requested as an output image. Reading with the RGB color sensors generates a color shift, so a sub scanning color shift correction unit 501 and main scanning color shift correction unit 502 need to correct it. This impairs the MTF (Modulation Transfer Function), making a character edge unsharp. To prevent this, when the text mode is selected as an original mode, the speed priority setting is validated to read an original using the BW monochrome sensor. In the photo mode and text/photo mode, which of the image quality and speed is given priority is selected and processing is done based on the set value, similar to the first embodiment, in order to balance the tone reproducibility and reading speed.

Figure 10:
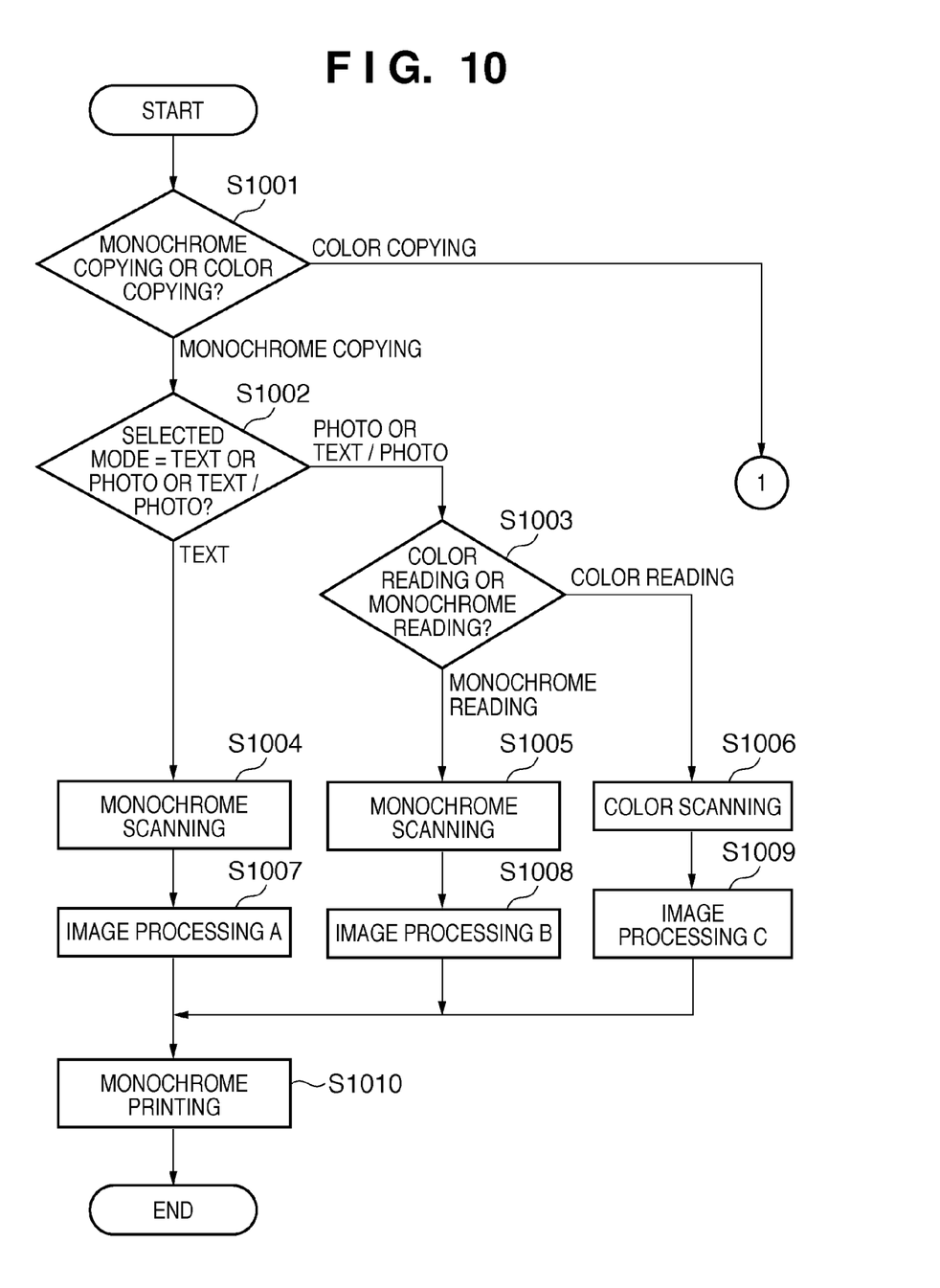
FIG. 10 is a flowchart showing a processing sequence in the fourth embodiment.

A processing sequence in the fourth embodiment will be described. FIG. 10 is a flowchart showing a processing sequence according to the fourth embodiment. If the user selects monochrome copying in S1001 of FIG. 10, a window to select an original mode appears in S1002. In this window, the user selects a mode. If the user selects the text mode in S1002, monochrome reading (speed priority) is automatically selected without determining which of color reading and monochrome reading is to be performed.

Figure 11:
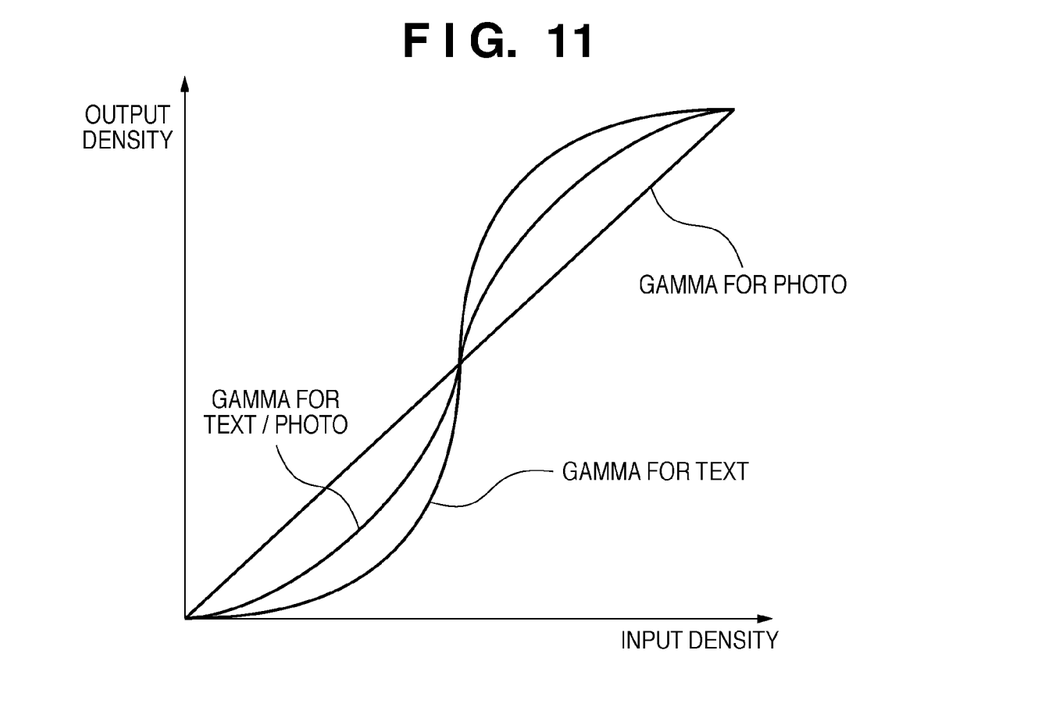
FIG. 11 is a graph showing a gamma correction coefficient in the fourth embodiment.

In S1004, an original is read using a BW monochrome sensor in a CCD sensor 218, acquiring monochrome image data. Image processing A is done in S1007, and a printer 300 is used to print in monochrome in S1010. In image processing A in S1007, an input image processing unit 500, intermediate image processing unit 600, and output image processing unit 700 perform processes. Since scanning is done using only the BW monochrome sensor, the sub scanning color shift correction unit 501 and main scanning color shift correction unit 502 in the input image processing unit 500 need not execute processing. An image area determination unit 503 need not perform processing, either. The output image processing unit 700 executes gamma correction and the like. At this time, a filtering unit 703 performs edge enhancement and the like. A gamma correction unit 704 performs correction using a correction coefficient for the text mode shown in FIG. 11. If the user selects the photo mode or text/photo mode in S1002, he selects in S1003 which of monochrome reading and color reading is to be performed.

If the user selects monochrome reading in S1003, an original set on the platen glass is read using the BW monochrome sensor in the CCD sensor 218, acquiring monochrome image data in S1005. Image processing B is done in S1008, and the printer 300 is used to print in monochrome in S1010. In image processing B in S1008, the input image processing unit 500, intermediate image processing unit 600, and output image processing unit 700 perform processes. Since scanning is done using only the BW monochrome sensor, the sub scanning color shift correction unit 501 and main scanning color shift correction unit 502 in the input image processing unit 500 need not execute processing. If the user selects the photo mode in S1002, the image area determination unit 503 need not perform processing. The gamma correction unit 704 performs correction using a correction coefficient for the photo mode shown in FIG. 11. If the user selects the text/photo mode in S1002, the gamma correction unit 704 performs correction using a correction coefficient for the text/photo mode shown in FIG. 11. If the user selects color reading in S1003, an original is read using the RGB color sensors in the CCD sensor 218, acquiring color image data in S1006.

Image processing C is done in S1009, and the printer 300 is used to print in monochrome in S1010. In image processing C in S1009, the input image processing unit 500, intermediate image processing unit 600, and output image processing unit 700 execute processes. If the user selects the photo mode in S1002, the image area determination unit 503 need not perform processing. The gamma correction unit 704 executes correction using a correction coefficient for the photo mode shown in FIG. 11. If the user selects the text/photo mode in S1002, the gamma correction unit 704 performs correction using a correction coefficient for the text/photo mode shown in FIG. 11. If the user selects color copying in S1001 of FIG. 10, the same processes as S905 and subsequent steps in FIG. 9 are done.

According to the fourth embodiment, an appropriate reading mode is automatically selected in correspondence with a mode set based on each original type. Both the tone reproducibility and reading speed of an image can be properly satisfied.

<Fifth Embodiment>

The fifth embodiment of the present invention will be described. The fifth embodiment will explain a method of switching sensors based on the number of original sheets to be read in monochrome sensor switching. If the number of original sheets to be read is small in monochrome output, the effect of selecting speed priority may be small. To the contrary, if the number of original sheets to be read is large and image quality priority is selected, the productivity decreases. Considering this, the reading mode is switched in accordance with the number of original sheets to be read. At this time, a weight detection unit (not shown) detects the weight of an original to be read, and the reading mode is switched based on the weight. When the weight is light, image quality priority is effective because color reading (image quality priority) using the RGB color sensors is almost equal in speed to monochrome reading (speed priority) using the BW monochrome sensor.

Figure 12:
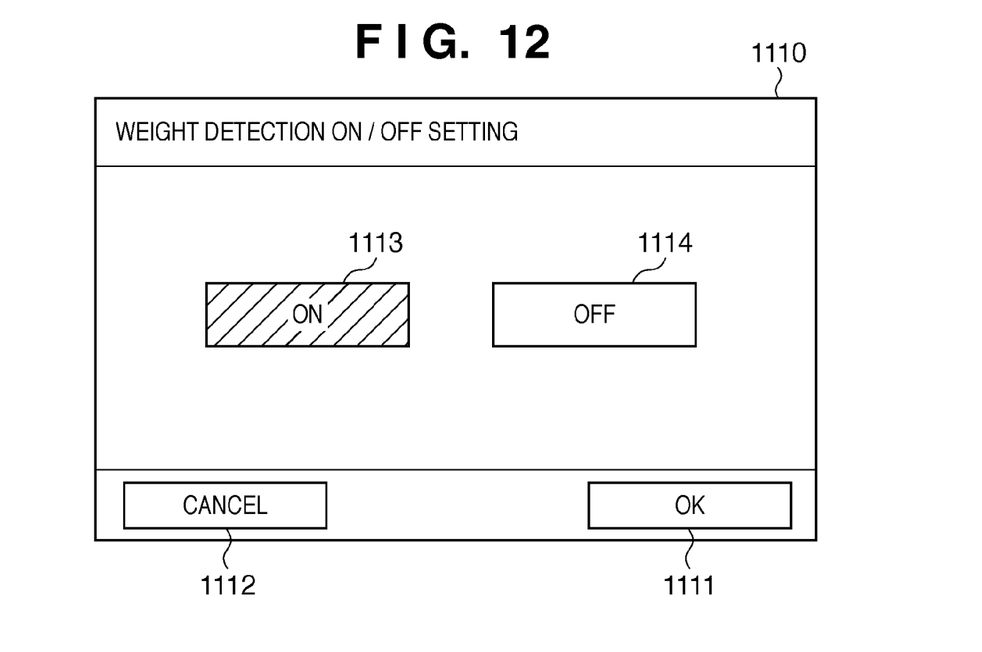
FIG. 12 is a view exemplifying an operation window in the fifth embodiment.

FIG. 12 exemplifies an operation window for the above-described weight detection function. When the weight detection setting is ON, the weight detection unit (not shown) detects the weight of an original. When the weight detection setting is OFF, the weight detection unit (not shown) does not detect the weight of an original. A weight detection setting window 1110 has a weight detection function ON button 1113, weight detection function OFF button 1114, OK button 1111, and cancel button 1112. The user operates the weight detection function ON button 1113 or weight detection function OFF button 1114 to designate validation or invalidation of the weight detection function. When the user presses the OK button 1111, the setting content of the weight detection function displayed immediately before pressing the button is held and the operation window disappears. When the user presses the cancel button 1112, the setting content of the weight detection function displayed immediately before opening the operation window is held and the operation window disappears. Note that the weight detection function operation window is not limited to this form and is arbitrary as long as the same setting can be made.

A processing sequence in the fifth embodiment will be explained with reference to FIG. 9. If the weight detection setting is set ON and the weight detection unit (not shown) determines that the weight is light, image quality priority (color scanning) is validated without using a setting on the monochrome sensor switching setup window in FIG. 8 in S902 of FIG. 9, and processes in S903 and subsequent steps are done. If the weight detection unit (not shown) determines that the weight is heavy, a setting on the monochrome sensor switching setup window in FIG. 8 is validated in S902 of FIG. 9. After that, processes in S903 or S904 and subsequent steps are executed. When a weight detection unit is not attached or the weight detection function is OFF, a setting on the monochrome sensor switching setup window in FIG. 8 is validated in S902 of FIG. 9, and processes in S903 or S904 and subsequent steps are performed. The determination criterion of an original weight is not especially limited. The determination criterion may be defined for each paper size and is not particularly limited.

In the fifth embodiment, when the number of original sheets is small, the speed does not greatly differ between the reading modes. The reading mode can be automatically set to image quality priority, obtaining an image with high tone reproducibility. If necessary, the user can utilize the weight detection function by switching on/off the function, and attain an image he wants.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-072864, filed Mar. 24, 2009, which is hereby incorporated by reference herein in its entirety.

What is claimed is:

1. An image processing apparatus which reads an original to generate monochrome image data, comprising:
   a determination unit configured to determine which of a first and a second instruction is input, wherein the first instruction is an instruction to read the original using RGB sensors and wherein the second instruction is an instruction to read the original using a BW sensor;
   a reading unit configured to read the original using the RGB sensors in a case where monochrome output is instructed and the determination unit determined that the first instruction is input, and to read the original using the BW sensor in a case where monochrome output is instructed and the determination unit determined that the second instruction is input; and
   a generation unit configured to generate monochrome image data for the original read by the reading unit.

2. The apparatus according to claim 1, wherein the first instruction is an instruction to read the original by giving priority to image quality of the original, and the second instruction is an instruction to read the original by giving priority to reading speed of the original.

3. The apparatus according to claim 1, further comprising:
a color output instruction unit configured to instruct color output for a read original,
wherein in a case where color output is instructed by the color output instruction unit, the reading unit reads the original using the RGB sensors and the generation unit generates color image data for the read original.

4. The apparatus according to claim 1, wherein in a case where a document feeder is not mounted on the reading unit, an inputted instruction is invalidated and the reading unit reads the original using the RGB sensors and the generation unit generates monochrome image data for the read original.

5. The apparatus according to claim 1, further comprising a mode setting unit configured to accept mode setting of one of a text mode, a photo mode, and a text/photo mode,
wherein in a case where the text mode is set via the mode setting unit, the reading unit reads the original using the BW sensor and the generation unit generates monochrome image data for the read original, and in a case where the photo mode or the text/photo mode is set via the mode setting unit, processing by the determination unit, the reading unit, and the generation unit is performed.

6. The apparatus according to claim 1, further comprising:
a weight detection unit configured to detect a weight of an original to be read; and
a weight detection setting unit configured to accept a setting of validating or invalidating the weight detection unit,
wherein the weight detection unit determines, based on a determination criterion of weight defined in advance for a weight of the original, whether the weight of the original is light or heavy, and wherein in a case where the weight detection unit determines that the weight of the original is light, the reading unit reads the original using the RGB sensors, and whereas in a case where the weight detection unit determines that the weight of the original is heavy, processing by the determination unit, the reading unit, and the generation unit is performed.

7. A method of controlling an image processing apparatus which reads an original to generate monochrome image data, the method comprising the steps of:
determining which of a first and a second instruction is input, wherein the first instruction is an instruction to read the original using RGB sensors and wherein the second instruction is an instruction to read the original using a BW sensor;
reading the original using the RGB sensors in a case where monochrome output is instructed and it is determined that the first instruction is input in the determination step, and reading the original in monochrome using the BW sensor in a case where monochrome output is instructed and it is determined that the second instruction is input in the determination step; and
generating monochrome image data for the original read in the reading step.

8. A non-transitory computer-readable storage medium storing a control program which causes a computer to execute an image processing apparatus control method, the control program causing the computer to execute:
a determination step of determining which of a first and a second instruction is input, wherein the first instruction is an instruction to read the original using RGB sensors and wherein the second instruction is an instruction to read the original using a BW sensor,
a reading step of reading the original using the RGB sensors in a case where monochrome output is instructed and it is determined that the first instruction is input in the determination step, and reading the original in monochrome using the BW sensor in a case where monochrome output is instructed and it is determined that the second instruction is input in the determination step, and
a generation step of generating monochrome image data for the original read in the reading step.

9. The apparatus according to claim 1, wherein in a case where monochrome output is instructed and platen reading is performed, an inputted instruction is invalidated and the reading unit reads the original using the RGB sensors and the generation unit generates monochrome image data for the read original.

* * * * *